US012754520B2

(12) United States Patent
Raichelgauz

(10) Patent No.: US 12,754,520 B2
(45) Date of Patent: Oct. 6, 2026

(54) AI MODELS GENERALIZATION FOR DRIVING

(71) Applicant: AUTOBRAINS TECHNOLOGIES LTD, Tel Aviv-Jaffa (IL)

(72) Inventor: Igal Raichelgauz, Tel Aviv (IL)

(73) Assignee: AUTOBRAINS TECHNOLOGIES LTD., Tel Aviv (IL)

( * ) Notice: Subject to any disclaimer, the term of this patent is extended or adjusted under 35 U.S.C. 154(b) by 39 days.

(21) Appl. No.: 18/944,555

(22) Filed: Nov. 12, 2024

(65) Prior Publication Data

US 2025/0390068 A1 Dec. 25, 2025

Related U.S. Application Data

(63) Continuation-in-part of application No. 18/914,932, filed on Oct. 14, 2024, and a continuation-in-part of application No. 18/748,220, filed on Jun. 20, 2024, now Pat. No. 12,505,334.

(51) Int. Cl.
*G05B 13/02* (2006.01)
*G01C 21/34* (2006.01)

(52) U.S. Cl.
CPC ..... *G05B 13/0265* (2013.01); *G01C 21/3446* (2013.01)

(58) Field of Classification Search
CPC ........................ G05B 13/0265; G01C 21/3446
See application file for complete search history.

(56) References Cited

U.S. PATENT DOCUMENTS 12,298,953 B1 * 5/2025 Noce .................. G06F 16/2246
2021/0191407 A1 * 6/2021 Benisch .............. G05D 1/0221
2025/0342398 A1 * 11/2025 Li .......................... G06N 20/00

* cited by examiner

*Primary Examiner* — Navid Z. Mehdizadeh
*Assistant Examiner* — Matthew Ho
(74) *Attorney, Agent, or Firm* — RECHES PATENTS

(57) ABSTRACT

A method of AI models generalization for driving. The method includes identifying road segments artificial intelligence models based on a similarity metric between different road segments along one or more different driving routes and further in accordance with a route benchmark. Each road segments artificial intelligence model is generated in association with a road segment for the driving route, by collecting driving data relating directly to the road segment and reflecting behavioral data of drivers captured along the road segment. And creating a general artificial intelligence model for at least a portion of the driving route, by automatically merging at least a portion of the road segments artificial intelligence models for the different road segments based on the similarity metric, to provide a decision making that complies with the different road segments along the one or more different driving routes.

17 Claims, 9 Drawing Sheets

700

AI MODELS GENERALIZATION FOR DRIVING

BACKGROUND

Vehicles include machine learning processes that are trained to cope with a vast number of scenarios. Nevertheless, following the learning process, the vehicles may face post-training scenarios.

There is a growing need to cope with the post-training scenarios.

SUMMARY

There is provided a method, a non-transitory computer readable medium and a system as illustrated in the application.

BRIEF DESCRIPTION OF THE DRAWINGS

The embodiments of the disclosure will be understood and appreciated more fully from the following detailed description, taken in conjunction with the drawings in which.

DETAILED DESCRIPTION

Figure 1:
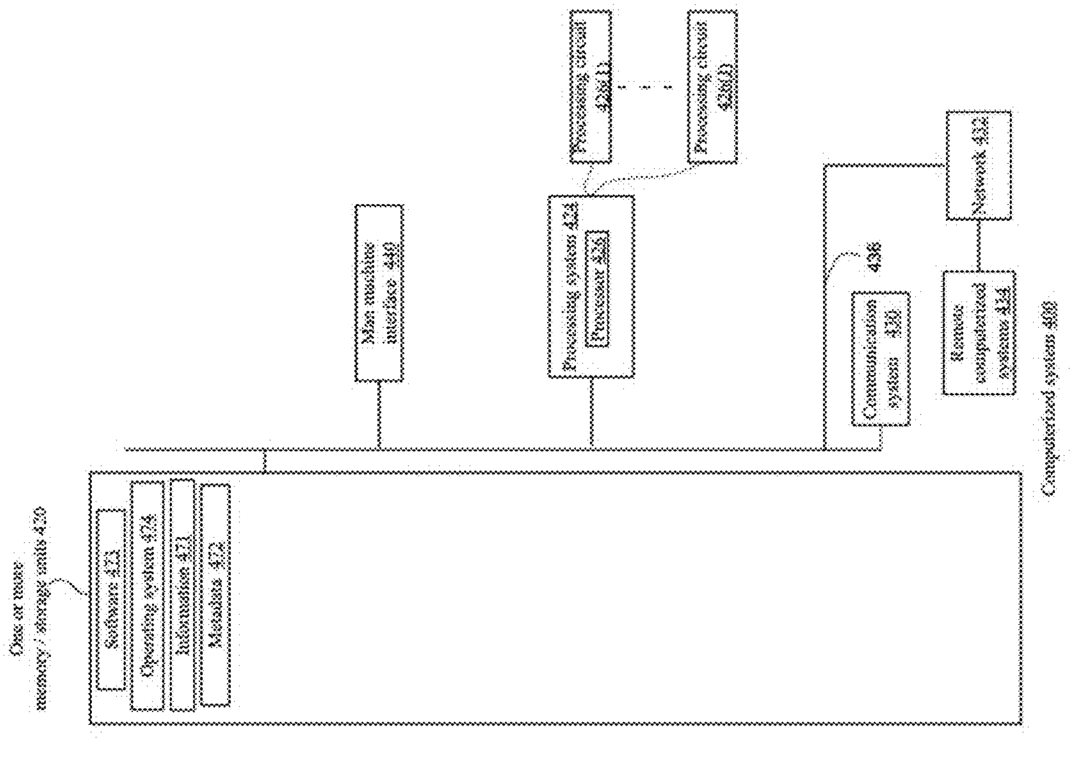
FIG. 1 illustrates an example of a computerized system.

The different figures illustrates examples of units and/or software and/or information items and/or steps and/or components. These examples are provided for brevity of explanation. At least one of the units and/or software and/or information items and/or steps and/or components is optional or mandatory.

The term obtaining include receiving and/or generating.

According to an embodiment a scenario (such as a driving scenario) includes at least one of (a) one or more weather conditions, (b) one or more contextual parameters, (c) a road condition, (d) a traffic parameter. Various examples of a road condition may include the roughness of the road, the maintenance level of the road, presence of potholes or other related road obstacles, whether the road is slippery, covered with snow or other particles. Various examples of a traffic parameter and the one or more contextual parameters may include time (hour, day, period or year, certain hours at certain days, and the like), a traffic load, a distribution of vehicles on the road, the behavior of one or more vehicles (aggressive, calm, predictable, unpredictable, and the like), the presence of pedestrians near the road, the presence of pedestrians near the vehicle, the presence of pedestrians away from the vehicle, the behavior of the pedestrians (aggressive, calm, predictable, unpredictable, and the like), risk associated with driving within a vicinity of the vehicle, complexity associated with driving within of the vehicle, the presence (near the vehicle) of at least one out of a kindergarten, a school, a gathering of people, and the like. A contextual parameter may be related to the context of the sensed information-context may be depending on or relating to the circumstances that form the setting for an event, statement, or idea.

AI stands for artificial intelligence. In some of the figures and for brevity of explanation the artificial intelligence models are referred to as AI models.

According to an embodiment an artificial intelligence model that is associated with a certain road segment is trained to provide a decision making that is related to a road segment identified by a road segment scenario identifier.

The decision making based on road segment, especially when a path of the vehicle is known, allows to effectively pre-fetch artificial intelligence model related data and/or parameters to a cache memory which speeds up the execution of any AI processing, improves memory utilization and allows to use a smaller cache memory.

According to an embodiment, the method searches between similarity between road segments. The similarity may be determined using a similarity metric. The similarity metric may determine the similarity between road segments—for example similarity between environmental information sensed when driving through the road segments, similarity between one or more scenarios that are included in the road segments, similarity of objects that appear in the road segments, similarity between behaviors of vehicle that passes through the road segments, similarity between expected or accrual driving patterns of ego vehicles when driving through the road segments, and the like. The similarity may be measured using any mathematical distance.

According to an embodiment, similarity between road segments is used for at least one of:

- Speeding up the training of an AI model related to a new road segment.
- Improving the accuracy of the AI models of the new segments.
- Reduce the number of AI models by using a single AI model in relation to a plurality of road segments that are similar to each other.
- Increasing the amount of data used to train the new AI model.
- Provide a more generalized AI model by merging an AI model of a new road segment with an AI model of an existing AI model that was previously developed and is associated with an existing road segment that is similar to the new AI model.

According to an embodiment there is provided a system of scalable AI models generalization for road segments across different routes, the system includes at least one processing device configured to identify, by a computerized system, based on a similarity metric between road segments along a driving route and in accordance with a route benchmark, road segments artificial intelligence models, wherein the road segments artificial intelligence models are generated each in association with a road segment for the driving route, by collecting driving data relating directly to the road segment and reflecting behavioral data of drivers captured along the road segment, to provide a decision making that is adaptive to the road segment; and create a general artificial intelligence model for at least a portion of the driving route, by automatically merging at least a portion of the road segments artificial intelligence models for different road segments of the one or more different driving routes based on, at least in part, the similarity metric, to provide a decision making that complies with the different road segments along the different driving routes.

According to an embodiment, the at least one processing devices are configured to determine a route benchmark for the driving route.

The route benchmark may be indicative of an amount of information required to train an AI model that is deemed a mature AI model usable for inference in related to driving an at least partially autonomous vehicle.

According to an embodiment, the route benchmark may be determined by using statistics regarding the amount of information that was used to train AI models that were deemed mature (for example taking the average amount, or any percentile of the amount—for example an amount for which at least 90% of the AI models were deemed mature.

According to an embodiment, the route benchmark may be determined responsive to one or more additional parameters, such as complexity of the road segment, risk factors associated with a road segment, and the like taking into account that more complex road segments and/or more risky road segments may require more data.

According to an embodiment, the amount of information required to reach a route benchmark may be determined based on results of experiments on short routes with less trained, or skilled AI models.

According to an embodiment, the route benchmark may be determined based on scenarios associated with the road segments, so that an AI model associated with a road segment may be regarded as mature AI model if there is enough information gained in relation to all scenarios included in the road segment.

Regarding the route bench mark—assuming, for example, that there is a need to conduct a first plurality of driving sessions of a specified duration in order to provide a third plurality of mature AI models for the fourth plurality of road segments. Under these assumptions—once enough driving sessions of the required average duration are completed—then the corresponding AI models may be deemed to be mature. According to an embodiment, this may trigger a generation of one or more general AI models. In an example—it may be determined that there is a need to conduct 1000 driving sessions of at least 20 minutes each in order to provide 1000 mature AI models for the first 1000 of road segments.

According to an embodiment—the merging of the AI models may create, incorporate with, or feed into the Liquid architecture arrangement.

According to an embodiment, with the merging of AI models for different road segments, typically triggers the generalization of AI models.

According to an embodiment, following the generation of the third plurality of AI models (for example 1000 or any other numbae), for the next road segments (for example the 1001th road segment) the corresponding AI model is generated in a manner that is highly influenced from the generalized AI model(s). According to an embodiment, that next AI model may be used to tune the one or more generalized AI model.

According to an embodiment, the creating and merging of AI models across road segments may bring a correlation between edge cases for different AI models of related road segments.

According to an embodiment, the creating and merging of AI models may create statistically fewer number of edge cases (bounded by the correlation between the road segments). And allows for addressing the road segments in a better manner.

According to an embodiment, the processing devices may be configured to provide an indication with respect to a requirement for a generation of a mature road segment artificial intelligence model, in accordance with the route benchmark.

According to an embodiment, the processing devices may be configured to generate another road segment artificial intelligence model for another road segment, using the general artificial intelligence model. According to an embodiment, the general artificial intelligence model may be used "as is" for the next road segment—when there is a similarity between the driving behavior of the ego vehicle when using the general AI model in one road segment and the required driving behavior of the ego vehicle in another road segment. According to an embodiment, the general AI model may be used as an initial setting for the training of the AI model for the next road segment.

According to an embodiment, the other road segment is along another driving route that is different from the one or more different driving routes. Accordingly—AI models learnt at one location can be used for other locations.

According to an embodiment, the other road segment is along at least one of the one or more different driving routes.

According to an embodiment, the at least one processing devices are configured to incorporate the general artificial intelligence model within a liquid arrangement of artificial intelligence models.

According to an embodiment, the at least one processing devices are configured to incorporate based on an artificial intelligence model representation correlation between the general artificial intelligence model and the artificial intelligence models of the liquid arrangement. An example of a liquid architecture is illustrated in U.S. patent application Ser. No. 18/466,777, entitled "Solving Inaccuracies Associated with Object Detection" and in U.S. patent application Ser. No. 18/466,781, entitled "Improving an Accuracy of a Deep Neural Network".

According to an embodiment, the liquid architecture may include multiple AI models configured to provide decision making in driving through road segments. When finding that the existing multiple AI models are not mature to cope with driving through a new road segment, a new AI model may be generated to provide a decision making with driving through the new road segment, and a routing rule for routing information gained while driving through the new road segment to the new AI model may be generated.

According to an embodiment, with the liquid arrangement of the artificial intelligence models may be implemented by using neural networks. One or more processing devices may be configured to incorporate the AI models into the liquid arrangement by utilizing a shared plurality of neural neurons with at least a part of the neural networks.

According to an embodiment, a generalized AI model may be incorporated into the liquid arrangement, based on a sharable representation correlation. According to an embodiment, the generalized AI model may be generated based on separately trained AI models. For example, by using hierarchical clustering in model weight space to identify which layers of the separately trained AI models can be shared between AI models to save memory and storage space, as well as processing and computational resources.

According to an embodiment there is provided a system of AI road segment models generalization, the system comprising at least one processing device configured to: identify a similarity metric between a first road segment and a second road segment, wherein a first artificial intelligence model is generated in association with the first road segment, by collecting driving data relating directly to the first road segment and reflecting behavioral data of drivers captured along the first road segment, to provide a decision making that is adaptive to the first road segment; and generate a second artificial intelligence model in association with the second road segment, based on, at in part at least one of: the first artificial intelligence model, or a first dataset fed to the first artificial intelligence model during a generating of the first artificial intelligence model, to provide a decision making that is adaptive to the second road segment.

According to an embodiment, the processing device may be configured to generate the second artificial intelligence model by initializing at least a part of the second artificial intelligence model to a corresponding at least part of the first artificial intelligence model. For example—one or more weights of the first AI model are copied to corresponding weights of the second AI models. Assuming an implementation using neural networks—one or more weights of the first neural network are copied to corresponding one or more weights of the second neural network.

According to an embodiment, the processing device may be configured to generate the second artificial intelligence model by feeding to the second artificial model, during a training of the second artificial intelligence model, a second dataset associated with the second road segment, the second dataset being at least a portion of the first dataset of the first artificial intelligence model.

According to an embodiment, the first road segment is for a first driving route and the second road segment is for a second driving route that is different from the first driving route.

According to an embodiment, the first road segment and the second road segment are for a similar driving route.

According to an embodiment, the processing device may be configured to learn the first artificial intelligence model is based on, at least in part, the generating of the second artificial intelligence model.

According to an embodiment, the processing device may be configured to learn the first artificial intelligence model by feeding, to the first artificial intelligence model, at least a part of the dataset of the second artificial intelligence model.

According to an embodiment, the at least one processing device may be configured to generate the second artificial intelligence model by initializing at least a part of the second artificial intelligence model to a corresponding at least part of the first artificial intelligence model.

According to an embodiment, one or more processing device may be configured to generate the second artificial intelligence model by feeding to the second artificial model, during a training of the second artificial intelligence model, a second dataset associated with the second road segment, the second dataset being at least a portion of the first dataset of the first artificial intelligence model.

According to an embodiment, the system is further adapted to assign, during the generating of the second artificial intelligence mode, first weights to the first dataset; and assign second weights to the second dataset, the second weights exceeding the first weights.

According to an embodiment, the system is further adapted to incorporate the second artificial intelligence model within a liquid arrangement of artificial intelligence models associated with different road segments.

According to an embodiment, the second artificial intelligence model may be incorporated within the liquid arrangement based on an artificial intelligence model representation correlation between the second artificial intelligence model and the artificial intelligence models of the liquid arrangement. An example of a representation correlation is illustrated in U.S. patent application Ser. No. 18/748,220, entitled "Shared Representation of Neural Network Resources".

According to an embodiment, with the liquid arrangement of the artificial intelligence models being implemented by neural networks, the second artificial intelligence model may be incorporated within the liquid arrangement by having a shared plurality of neural neurons with at least a part of the neural networks.

According to an embodiment, there is provided a non-transitory computer readable medium storing instructions that, when executable by at least one processing device, cause the device to: identify a similarity metric between a first road segment and a second road segment, wherein a first artificial intelligence model is generated in association with the first road segment, by collecting driving data relating directly to the first road segment and reflecting behavioral data of drivers captured along the first road segment, to provide a decision making that is adaptive to the first road segment; and generate a second artificial intelligence model in association with the second road segment, based on, at in part at least one of: the first artificial intelligence model, or a first dataset fed to the first artificial intelligence model during a generating of the first artificial intelligence model, to provide a decision making that is adaptive to the second road segment.

FIG. 1 illustrates an example of a computerized system 400.

Computerized system 400 includes a man machine interface 440 having or being in communication with man machine interface (MMI) controller (not shown), a communication system 430, one or more memory and/or storage units 420, a processing system 424 including processor 426. The computerized system may be a server, a laptop, a desktop or any other computer and may include or be in communication with a sensing unit and/or a controller.

According to an embodiment, computerized system 400 is in communication with network 432 and one or more other remote computerized systems 434 that are in communication with network 432. An example of a remote computerized system is a vehicle (such as vehicle 300 of FIG. 2), a server or one or more computers having access to a storage system.

According to an embodiment, the communication system 430 is configured to enable communication between the one or more memory and/or storage units 420 and/or any one of the additional units and/or the network 432 (that is in communication with the remote computerized systems). Communication system 430 is also configured to enable communication with other elements such as man machine interface 440.

The memory and/or storage units 420 was shown as storing software. Any reference to software should be applied mutatis mutandis to code and/or firmware and/or instructions and/or commands, and the like.

Processor 426 includes a plurality of processing units 426(1)-426(J), J is an integer that exceeds one. Any reference to one unit or item should be applied mutatis mutandis to multiple units or items. For example—any reference to processor should be applied mutatis mutandis to multiple processors, any reference to communication system 430 should be applied mutatis mutandis to multiple communication systems.

According to an embodiment, the one or more memory and/or storage units 420 includes one or more memory unit, each memory unit may include one or more memory banks.

According to an embodiment, the one or more memory and/or storage units 420 includes a volatile memory and/or a non-volatile memory. The one or more memory and/or storage units 420 may be a random-access memory (RAM) and/or a read only memory (ROM).

According to an embodiment, the non-volatile memory unit is a mass storage device, which can provide non-volatile storage of computer code, computer readable instructions, data structures, program modules, and other data for the processor or any other unit of vehicle. For example, and not meant to be limiting, a mass storage device can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any content may be stored in any part or any type of the memory and/or storage units.

According to an embodiment, the at least one memory unit stores at least one database—such as any database known in the art—such as DB2®, Microsoft® Access, Microsoft® SQL Server, Oracle®, mySQL, PostgreSQL, and the like.

The memory and/or storage units 420 are configured to store firmware and/or software, one or more operating systems, data and metadata required to the execution of any of the methods mentioned in this application.

The memory and/or storage units 420 was shown as storing software. Any reference to software should be applied mutatis mutandis to code and/or firmware and/or instructions and/or commands, and the like.

Various units and/or components are in communication with each other using any communication elements and/or protocols. An example of a communication system is denoted 430. Other communication elements may be provided.

The communication system 430 may be in communication with bus 436. The bus represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus, and all buses specified in this description can also be implemented over a wired or wireless network connection and each of the subsystems.

Network 432 is located outside the computerized system may be typically used for communication between the computerized system and at least one remote computing system and/or one or more vehicles. By way of example, a remote computing system can be a personal computer, a laptop computer, portable computer, a server, a router, a network computer, a peer device or other common network node, and so on. Logical connections between the processor and either one of remote computing systems can be made via a local area network (LAN) and a general wide area network (WAN). Such network connections can be through a network adapter (may belong to communication system 430) which can be implemented in both wired and wireless environments. Such networking environments are conventional and commonplace in offices, enterprise-wide computer networks, intranets, and a larger network such as the internet.

It should be noted that at least a part of the content illustrated as being stored in one or more memory/storage units 420 may be stored outside the computerized system. It should also be noted that the processor may evaluate signatures generated by a plurality of detectors.

Examples of generating signatures and/or cropping images are provided in U.S. patent application Ser. No. 18/527,701 which is incorporated herein by reference.

According to an embodiment, the memory and/or storage units 420 stores at least one of operating system 474, information 471, metadata 472, and software 473.

Examples of software include at least one of AI model generation software, road segment analysis software for gaining information used for training the AI models and/or for searching similar road segments.

Only one or some of these software may be stored in the one or more memory/storage units 420. There may be an overlap between the functionality of one or more of these software.

Examples of information and/or metadata include at least one of sensor input data, notifications, and the like.

By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by a computer.

Any content may be stored in any part or any type of memory and/or storage units.

According to an embodiment, at least one memory unit stores at least one database—such as any database known in the art—such as DB2®, Microsoft® Access, Microsoft® SQL Server, Oracle®, mySQL, PostgreSQL, and the like.

Various units and/or components are in communication with each other using any communication elements and/or protocols. An example of a communication system is denoted 430. Other communication elements may be provided.

According to an embodiment, processing system 424 is configured to perform method 700 while executing software.

Figure 2:
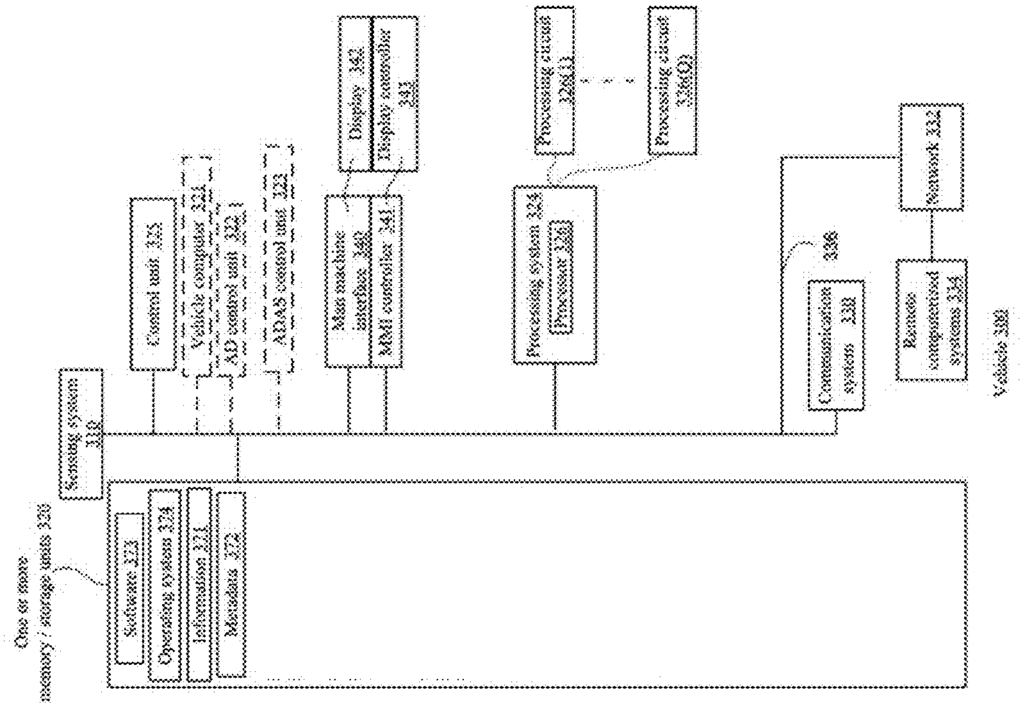
FIG. 2 illustrates an example of a vehicle.

FIG. 2 illustrates an example of vehicle 300.

Vehicle 300 includes a man machine interface 340 having or being in communication with man machine interface (MMI) controller 341, wherein in FIG. 1 the MMI is a display 342 or includes a display 342 and the MMI controller is a display controller 343 or includes the display controller 343, a communication system 330, one or more memory and/or storage units 320, a processing system 324 including processor 326. The communication system 330, the one or more memory and/or storage units 320, and the processing system 324 may belong to a computerized system of vehicle 300. The computerized system may be a server, a laptop, a desktop or any other computer and may include or be in communication with a sensing unit and/or a controller.

According to an embodiment, vehicle 300 is in communication with network 332 and one or more other remote computerized systems 334 that are in communication with network 332. An example of a remote computerized system is a server or one or more computers having access to a storage system that stores items related to one or more portions of one or more groups of neural networks—at least some of which are not currently stored in the vehicle.

According to an embodiment, the communication system 330 is configured to enable communication between the one or more memory and/or storage units 320 and/or any one of the additional units and/or the network 332 (that is in communication with the remote computerized systems). Communication system 330 is also configured to enable communication with other elements such as sensing system 310, man machine interface 340, control unit 325, vehicle computer 321, autonomous driving control unit 322 (denoted AD control unit), advanced driver assistance system (ADAS) control unit 323 (denoted ADAS control unit), and the like.

The memory and/or storage units 320 was shown as storing software. Any reference to software should be applied mutatis mutandis to code and/or firmware and/or instructions and/or commands, and the like.

Processor 326 includes a plurality of processing units 326(1)-326(Q), Q is an integer that exceeds one. Any reference to one unit or item should be applied mutatis mutandis to multiple units or items. For example—any reference to processor should be applied mutatis mutandis to multiple processors, any reference to communication system 330 should be applied mutatis mutandis to multiple communication systems.

According to an embodiment, the one or more memory and/or storage units 320 includes one or more memory unit, each memory unit may include one or more memory banks.

Any reference to memory and/or storage units 420 should be applied mutatis mutandis to one or more memory and/or storage units 320.

Any reference to communication system 430 should be applied mutatis mutandis to communication system 330.

Any reference to bus 436 should be applied mutatis mutandis to bus 336.

Any reference to network 432 should be applied mutatis mutandis to network 332.

According to an embodiment, the memory and/or storage units 320 stores at least one of: operating system 374, information 371, metadata 372, and software 373.

According to an embodiment, the memory and/or storage units 420 stores at least one of operating system 474, information 471, metadata 472, and software 473.

Examples of software include at least one of sensor data input processing software (for processing the sensor input data), artificial intelligence model software for implementing the artificial intelligence models, and the like.

Examples of information and/or metadata include at least one or more of sensor input data, road segment indicators, and the like.

The control unit 325 may cooperate with ADAS control unit 323 and/or with AD control unit 322 and/or may control or communicate with other vehicle components—including vehicle computer.

The ADAS control unit 323 is configured to control ADAS operations.

The AD control unit 322 is configured to control autonomous driving of the autonomous vehicle.

The vehicle computer 321 is configured to control the operation of the vehicle—especially controlling the engine, the transmission, and any other vehicle system or component.

The vehicle computer 321 may be in communication with an engine control module, a transmission control module, a powertrain control module, and the like.

The sensing system 310 may include optics, a sensing element group, a readout circuit, and an image signal processor. Optics are followed by a sensing element group such as line of sensing elements or an array of sensing elements that form the sensing element group. The sensing element group is followed by a readout circuit that reads detection signals generated by the sensing element group. An image signal processor is configured to perform an initial processing of the detection signals—for example by improving the quality of the detection information, performing noise reduction, and the like. The sensing system 310 is configured to output one or more sensed information units (SIUs) such as images, frames, audio segments, and any segment of unit of any sensed information unit.

Control unit 325 is configured to control the operation of the sensing system 310, and/or the one or more memory and/or storage units 320 and/or the one or more additional units (except the controller).

By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by a computer.

Any content may be stored in any part or any type of memory and/or storage units.

According to an embodiment, at least one memory unit stores at least one database—such as any database known in the art—such as DB2®, Microsoft® Access, Microsoft® SQL Server, Oracle®, mySQL, PostgreSQL, and the like.

Various units and/or components are in communication with each other using any communication elements and/or protocols. An example of a communication system is denoted 330. Other communication elements may be provided.

According to an embodiment, processing system 324 is configured to perform method 500, while executing software.

Figure 3:
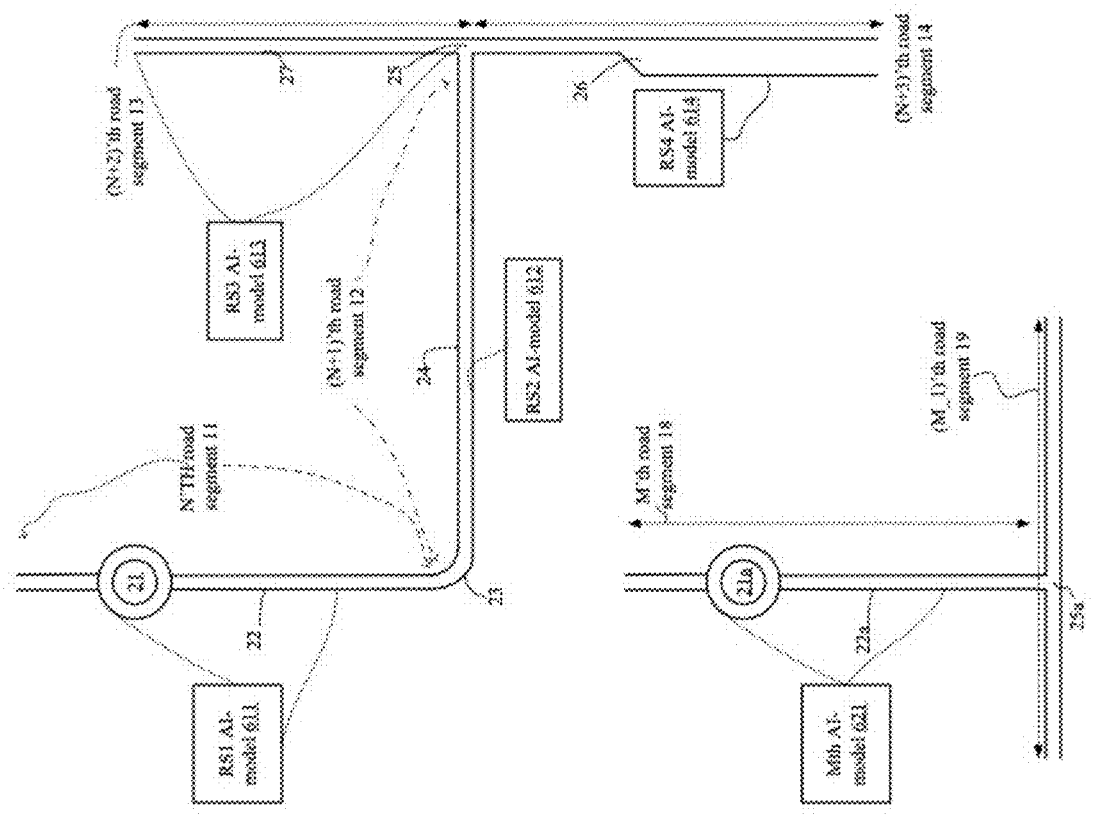
FIG. 3 illustrates an example of a road segments and artificial intelligence model capabilities.

FIG. 3 illustrates an example of road segments and artificial intelligence model capabilities.

The road segment includes first road segment 11 (RS1) (that includes roundabout 21 and a straight lane 22) that is associated with first road segment AI model, second road segment 12 (RS2) (that includes a curve 24 and a straight lane 24) that is associated with second road segment AI model, third road segment 13 (RS3) (that includes T-junction 25 and straight lane 27) that is associated with third road segment AI model, and fourth road segment 14 (RS4) (that includes a road broadening section 26) that is associated with fourth road segment AI model.

FIG. 3 illustrates six scenarios—first scenario (DS1) is a roundabout, second scenario (DS2) is a straight lane 24, a third scenario (DS3) is a curve, a fourth scenario (DS4) is a T-junction and a fifth scenario (DS5) is a road broadening section. Nevertheless—according to an embodiment—the selection is based on the road segments. An AI model associated with a road segments is trained to cope with the scenarios of the road segment.

FIG. 3 also illustrates that the following artificial intelligence models are selected:

i. Approaching roundabout 21—selecting first road segment AI model RS1 AI-model 611.
ii. Approaching straight lane 22—continue using first road segment AI model RS1 AI-model 611.
iii. Approaching curve 23—selecting second road segment AI model RS1 AI-model 612.
iv. Approaching straight lane 24—continue using second road segment AI model RS1 AI-model 612.
v. Approaching T-junction 25—selecting third road segment AI model RS1 AI-model 613.
vi. Approaching straight lane 27—maintaining third road segment AI model RS1 AI-model 613.
vii. Approaching road broadening section 26—selecting fourth road segment AI model RS1 AI-model 614.

It should be noted that more than a single artificial intelligence model may be selected per scenario—as illustrated by the selection of DS4 AI-model 614 and DS6 AI-model 616 when approaching the T-junction.

These artificial intelligence models are associated with different scenarios that differ from each other by at least one of (a) one or more weather conditions, (b) one or more contextual parameters, (c) a traffic parameter.

Both scenarios involve approaching the T-junction. For example—one of the artificial intelligence models is associated with a given lighting condition (for example approaching a T-junction that is being strongly illuminated while the other artificial intelligence models is associated with another lighting condition or is ignorant to the lighting condition.

According to an embodiment, the mapping between road segments and selected (activated) artificial intelligence models is used by a perception router. A selection, by a perception router by of more than one or more artificial intelligence models per scenario is illustrated in U.S. patent application Ser. No. 18/459,414 which is incorporated herein by reference. Any reference to a selection based on scenario should be applied mutatis mutandis to a selection based on a road segment—where a road segment associated AI model is trained to cope with all scenarios of the road segment.

Figure 4:
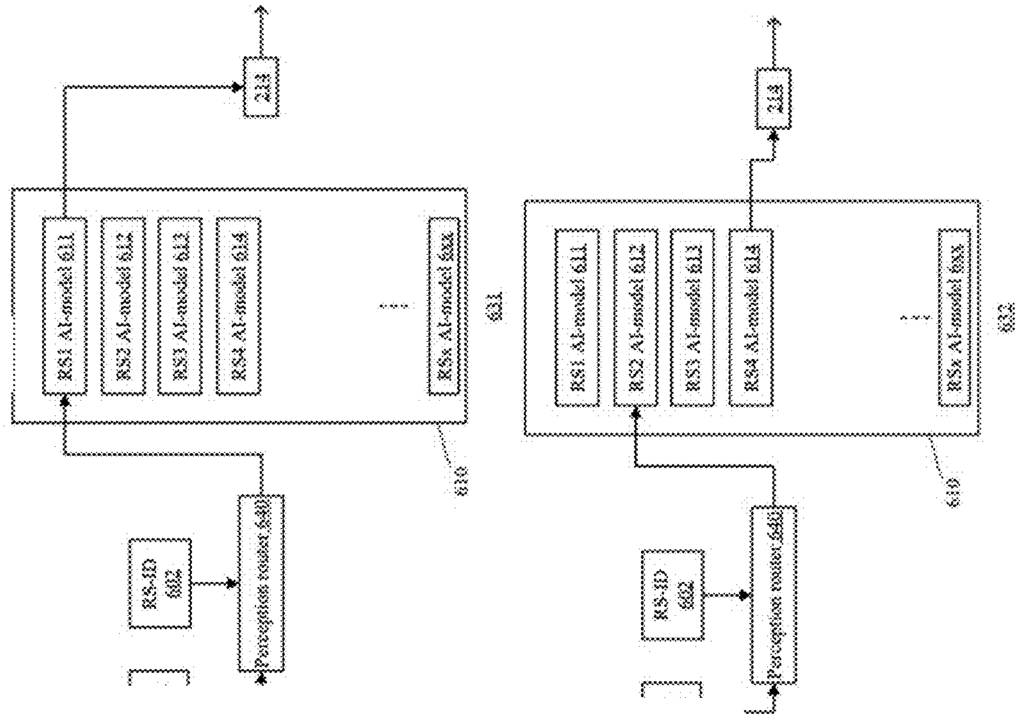
FIG. 4 illustrates examples of inference.

FIG. 4 illustrates an example of road segment identifier (RS-ID) 602.

Perception router 640 is fed by road segment identifier RS-ID 602, and selects one or more artificial intelligence models of a group or an ensemble of artificial intelligence models (collectively denoted 610) that includes RS1 AI-model 611, RS2 AI-model 612, RS3 AI-model 613, RS4 AI-model 614 . . . , to RSx AI-model 6*xx*. The selected AI model is also fed with sensor input data (raw or preprocessed).

The one or more outputs of the one or more selected artificial intelligence models are fed to output unit 214 that is configured to output a driving related decision—which may be more complex when more than a single artificial intelligence related agent is concurrently activated. The output unit operates according to defined rules such as outputting the output of a single selected artificial intelligence model, or apply a selection rule when more than a single artificial intelligence model is selected, apply a function on multiple outputs of concurrently selected artificial intelligence models—for example a weighted average, a selection of the safest output (for example with the minimal acceleration), and the like.

FIG. 4 illustrates the selection of RS1 AI model 611, and the selection of RS2 AI model 612—when reaching road segment identifier RS2.

Figure 5:
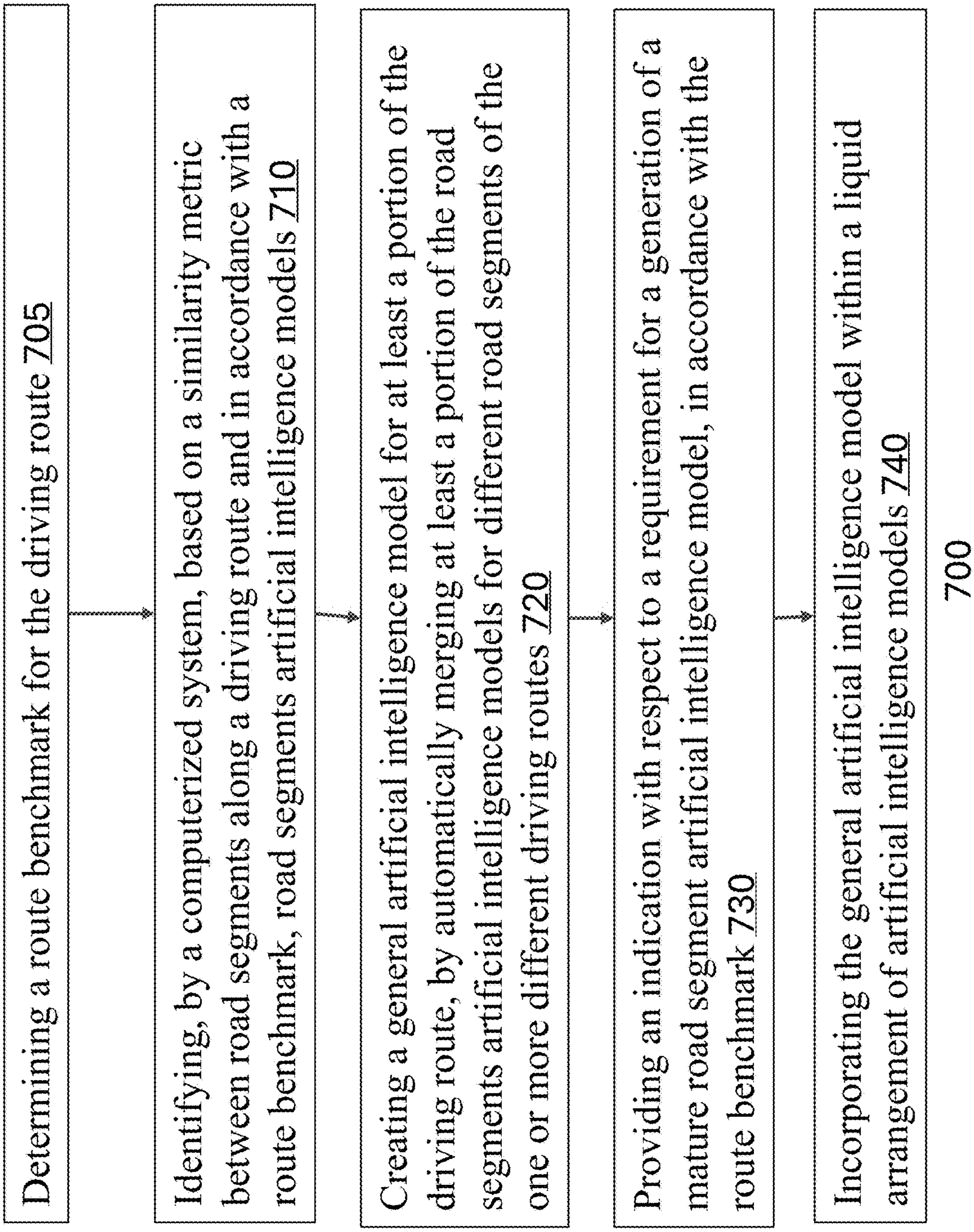
FIG. 5 illustrates an example of a method.

FIG. 5 illustrates an example of method 700 of scalable AI models generalization for road segments across different routes.

According to an embodiment, method 700 includes step 710 and step 720 that follows step 710.

According to an embodiment, step 710 includes identifying, by a computerized system, based on a similarity metric between road segments along a driving route and in accordance with a route benchmark, road segments artificial intelligence models. The road segments artificial intelligence models are generated each in association with a road segment for the driving route, by collecting driving data relating directly to the road segment and reflecting behavioral data of drivers captured along the road segment, to provide a decision making that is adaptive to the road segment.

According to an embodiment, step 720 includes creating a general artificial intelligence model for at least a portion of the driving route, by automatically merging at least a portion of the road segments artificial intelligence models for different road segments of the one or more different driving routes based on, at least in part, the similarity metric, to provide a decision making that complies with the different road segments along the different driving routes.

According to an embodiment, method 700 includes step 705 of determining a route benchmark for the driving route. The route benchmark is indicative of an amount of information required to train an AI model that is deemed a mature AI model usable for inference in related to driving an at least partially autonomous vehicle. According to an embodiment, the determining is based on statistics regarding the amount of information that was used to train AI models that were deemed mature (for example taking the average amount, or any percentile of the amount—for example an amount for which at least 90% of the AI models were deemed mature).

According to an embodiment, the determining is also responsive to one or more additional parameter such as complexity of the road segment, risk factors associated with a road segment, the like—more complex road segments and/or more risky road segments may require more data.

According to an embodiment, method 700 also includes step 730 of providing an indication with respect to a requirement for a generation of a mature road segment artificial intelligence model, in accordance with the route benchmark.

According to an embodiment, method 700 also includes generating another road segment artificial intelligence model for another road segment, using the general artificial intelligence model.

According to an embodiment, the other road segment is along another driving route that is different from the one or more different driving routes.

According to an embodiment, the other road segment is along at least one of the one or more different driving routes.

According to an embodiment, method 700 also includes step 740 of incorporating the general artificial intelligence model within a liquid arrangement of artificial intelligence models.

According to an embodiment, step 740 is based on an artificial intelligence model representation correlation between the general artificial intelligence model and the artificial intelligence models of the liquid arrangement. As already mentioned above, an example of a liquid architecture is illustrated in U.S. patent application Ser. No. 18/466,777, entitled "Solving Inaccuracies Associated with Object Detection" and in U.S. patent application Ser. No. 18/466,781, entitled "Improving an Accuracy of a Deep Neural Network". And an example of a sharable representation correlation is illustrated in U.S. patent application Ser. No. 18/748,220, entitled "Shared Representation of Neural Network Resources".

According to an embodiment, the liquid architecture includes multiple AI models that are configured to cope with driving through road segments. When finding that the existing multiple AI models are not fit to cope with driving through a new road segment, a new AI model is generated to cope with driving through the new road segment, and a routing rule for routing information gained while driving through the new road segment to the new AI model is generated.

According to an embodiment, with the liquid arrangement of the artificial intelligence models being implemented by neural networks, step 740 includes incorporating by having a shared plurality of neural neurons with at least a part of the neural networks.

Figure 6:
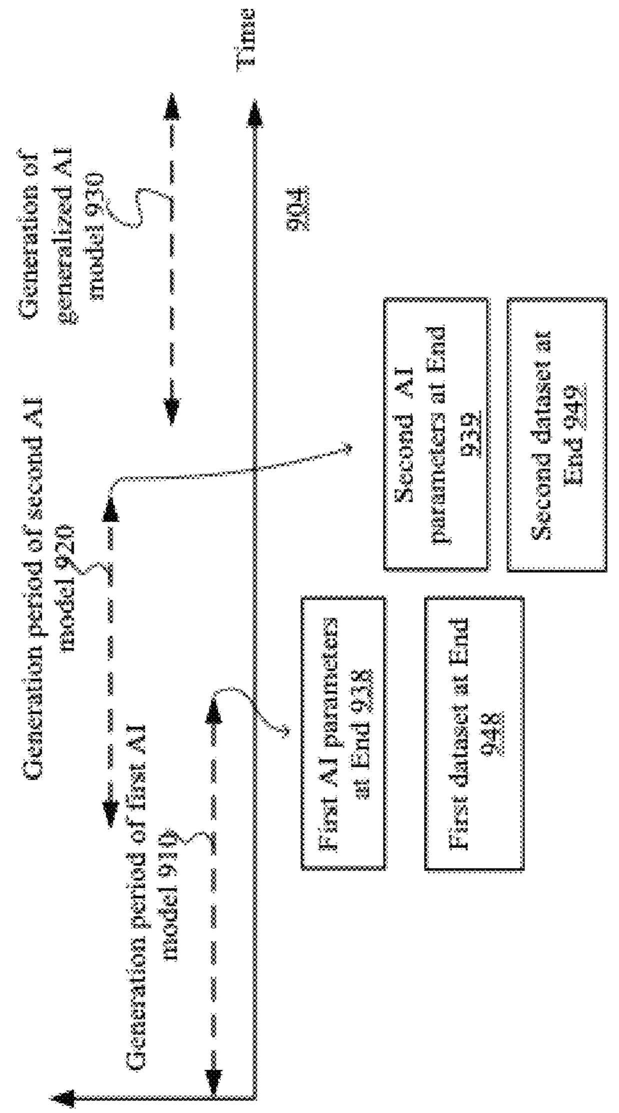
FIG. 6 illustrates examples of a method.

FIG. 6 illustrates an example of the generation of the first AI model (during first period 910), the generation of the second AI model (during second period 920) and the generation of the generalized AI model (during third period 930)—following the generation of the first and second AI models. At the end of the first period the first AI model is represented by first AI model parameters 938, after being trained using first dataset 948. At the end of the second period the second AI model is represented by second AI model parameters 939, after being trained using second dataset 949.

Figure 7:
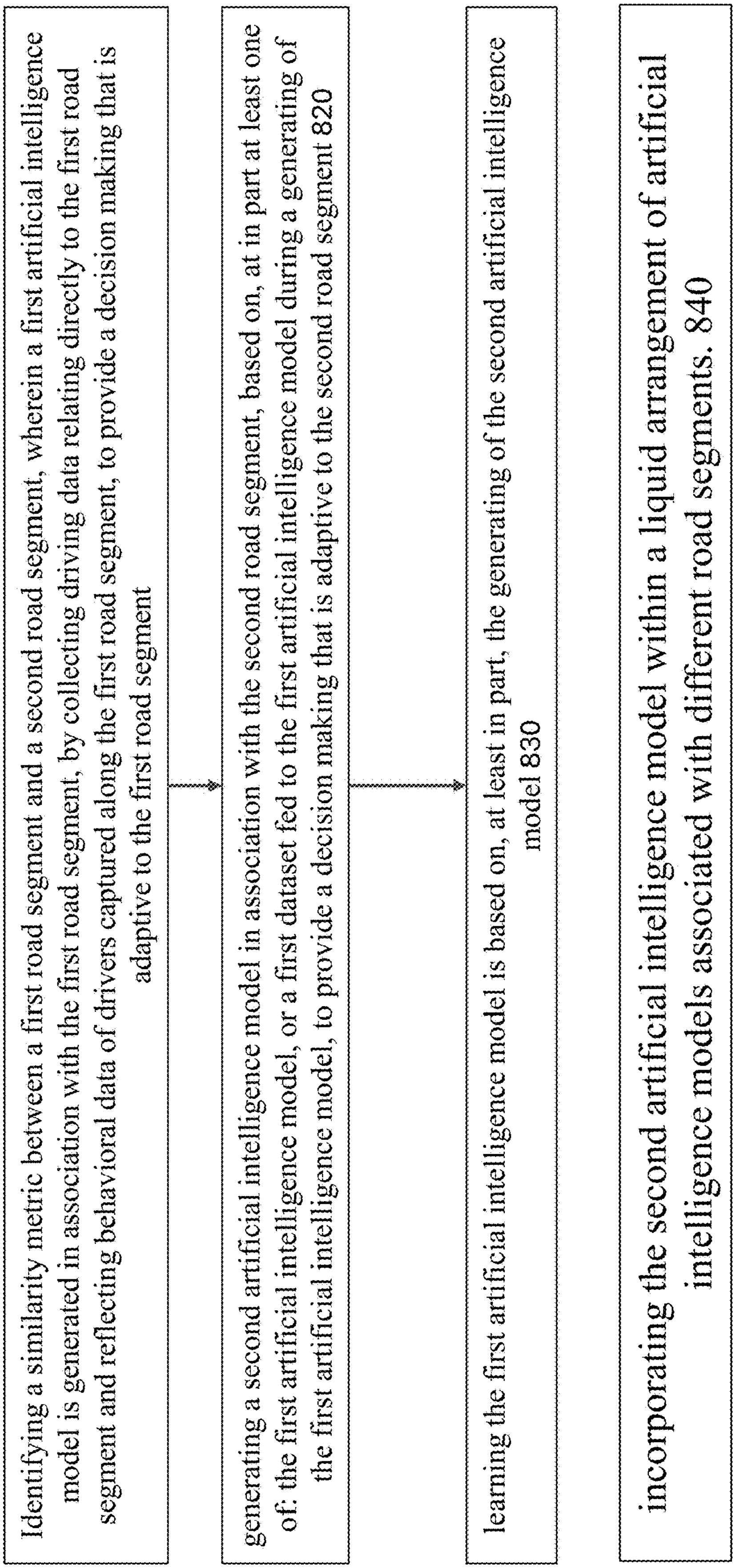
FIG. 7 illustrates an example of a vehicle.

FIG. 7 illustrates an example of method 800 of AI road segment models generalization. According to an embodiment, method 800 includes steps 810 and 820 that follows step 810.

According to an embodiment, step 810 includes identifying a similarity metric between a first road segment and a second road segment, wherein a first artificial intelligence model is generated in association with the first road segment, by collecting driving data relating directly to the first road segment and reflecting behavioral data of drivers captured along the first road segment, to provide a decision making that is adaptive to the first road segment.

According to an embodiment, step 820 includes generating a second artificial intelligence model in association with the second road segment, based on, at in part at least one of: the first artificial intelligence model, or a first dataset fed to the first artificial intelligence model during a generating of the first artificial intelligence model, to provide a decision making that is adaptive to the second road segment.

According to an embodiment, step 820 includes generating the second artificial intelligence model by initializing at least a part of the second artificial intelligence model to a corresponding at least part of the first artificial intelligence model. For example—one or more weights of the first AI model are copied to corresponding weights of the second AI models. Assuming an implementation using neural networks—one or more weights of the first neural network are copied to corresponding one or more weights of the second neural network.

According to an embodiment, step 820 includes generating the second artificial intelligence model by feeding to the second artificial model, during a training of the second artificial intelligence model, a second dataset associated with the second road segment, the second dataset being at least a portion of the first dataset of the first artificial intelligence model.

According to an embodiment, the first road segment is for a first driving route and the second road segment is for a second driving route that is different from the first driving route.

According to an embodiment, the first road segment and the second road segment are for a similar driving route.

According to an embodiment, step 820 is followed by step 830 learning the first artificial intelligence model is based on, at least in part, the generating of the second artificial intelligence model. Step 830 is followed by step 820.

According to an embodiment, step 830 includes feeding, to the first artificial intelligence model, at least a part of the dataset of the second artificial intelligence model.

According to an embodiment, step 830 includes generating the second artificial intelligence model by initializing at least a part of the second artificial intelligence model to a corresponding at least part of the first artificial intelligence model.

According to an embodiment, step 830 includes generating the second artificial intelligence model by feeding to the second artificial model, during a training of the second artificial intelligence model, a second dataset associated with the second road segment, the second dataset being at least a portion of the first dataset of the first artificial intelligence model.

According to an embodiment, method 800 includes assigning first weights to the first dataset; and assigning second weights to the second dataset, the second weights exceeding the first weights.

According to an embodiment, method 800 includes step 840 of incorporating the second artificial intelligence model within a liquid arrangement of artificial intelligence models associated with different road segments.

According to an embodiment, the incorporating of step 840 is based on an artificial intelligence model representation correlation between the second artificial intelligence model and the artificial intelligence models of the liquid arrangement.

According to an embodiment, with the liquid arrangement of the artificial intelligence models being implemented by neural networks, step 840 includes incorporating involves having a shared plurality of neural neurons with at least a part of the neural networks.

Figure 8:
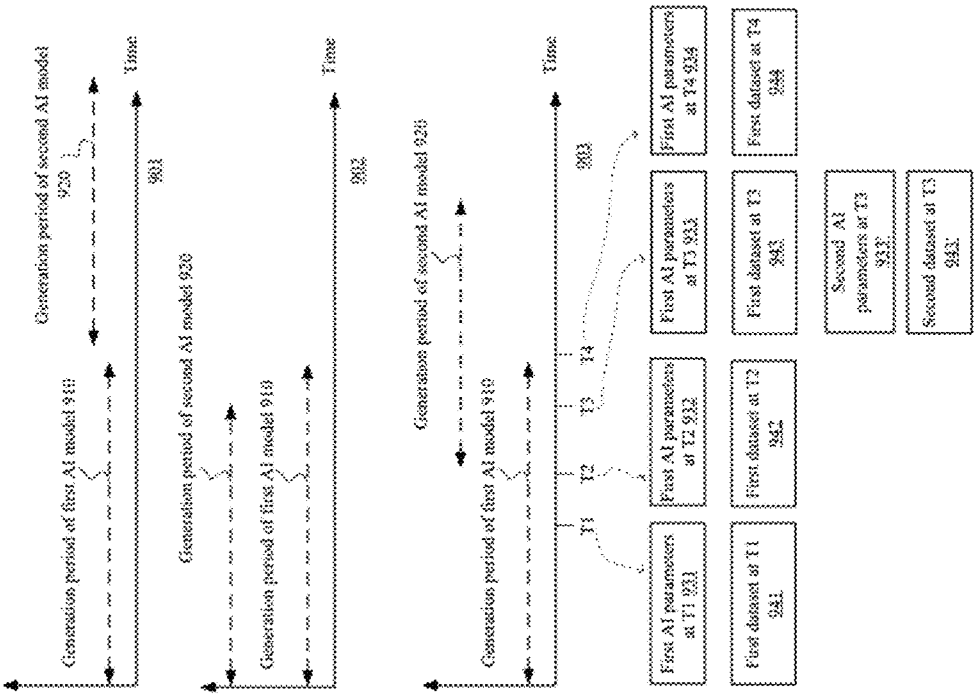
FIG. 8 illustrates an example of a method.

FIG. 8 illustrates an example of generations of the first and second AI models.

The first example shows that the first AI model is trained after the completion of the training of the first AI model—so that the training of the first AI model is not impacted by the training of the second AI model.

The second and third examples illustrate at least a partial overlap between the training of the first and second AI models—allowing the training of each AI model to be impacted by the training of the other AI model. The third example illustrates the dataset and the AI model parameters of the first AI model at four points of time and the dataset and the AI model parameters of the second AI model at the third point of time. Each of which may be providing to the training process of the other AI model.

Figure 9:
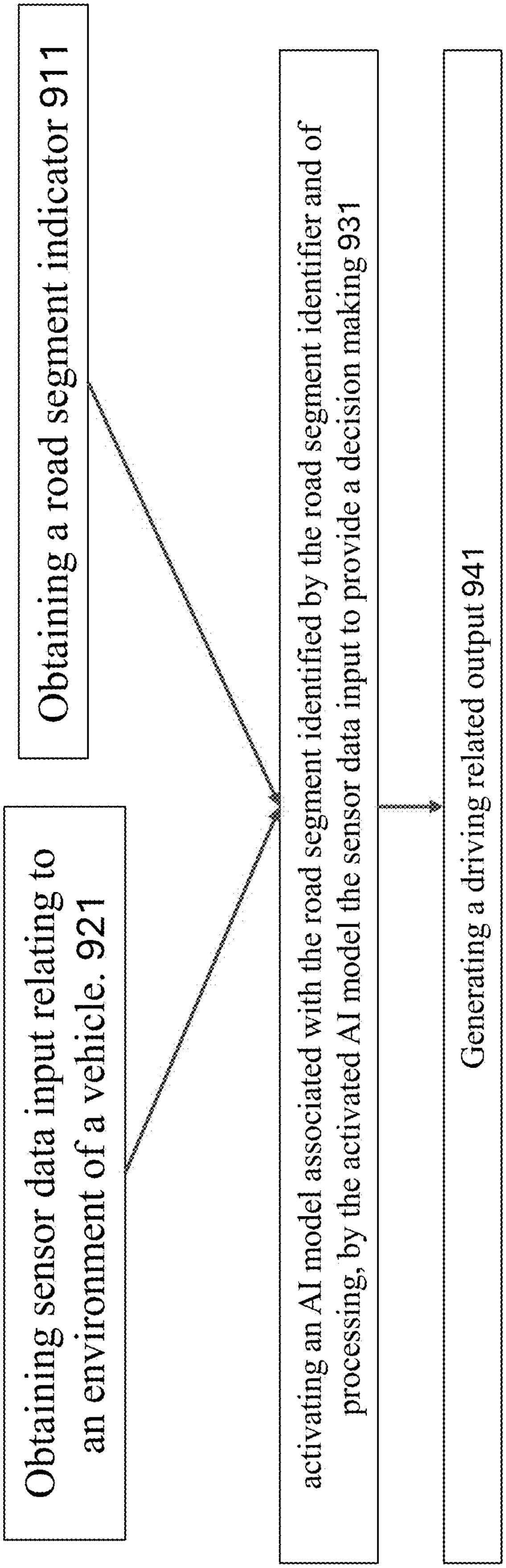
FIG. 9 illustrates an example of inference.

FIG. 9 illustrates an example of method 900 for providing adaptive decision making for autonomous driving applications.

According to an embodiment, method 900 includes steps 911 of obtaining a road segment indicator and step 921 of obtaining sensor data input relating to an environment of a vehicle.

According to an embodiment, the sensor data input is sensed by one or more sensors related to one or more vehicles. A sensor related to a vehicle may belong to the vehicle, may be attached to the vehicle, may be spaced apart from the vehicle, may follow a movement of the vehicle, may not follow the movement of the vehicle, may be an aerial sensor, a satellite sensor, an airborne sensor, a ground sensor, and the like.

According to an embodiment, any sensor of the one or more sensors related to the one or more vehicles may be at least one of an image sensor, a non-image sensor, a visible light sensor, a sensor operating in one or more frequencies other than visible light, a radar, a sonar, a magnetometer, a LIDAR, an ultrasonic sensor, an infrared sensor, a near infrared sensor, a radiometer, a thermal sensor, a microwave sensor, a x-ray sensor, a gravitometer, an altimeter, a barometer, a synthetic-aperture radar, a monochromatic sensor, a passive sensor, an active sensor, a sensor for sensing an environment of the vehicle.

According to an embodiment, any sensor of the one or more sensors related to the one or more vehicles may be a vehicle sensor sensing a status of one or more vehicle component (engine, brakes, chassis, wheels, gear, driving wheel, clutch, shock absorber), a vehicle velocity sensor, a vehicle acceleration sensor, and the like.

According to an embodiment, steps 911 and 921 are followed by step 931 of activating an AI model associated with the road segment identified by the road segment identifier and of processing, by the activated AI model the sensor data input to provide a decision making, to an autonomous driving application of the vehicle, that is adaptive to the road segment indication.

According to an embodiment, the obtaining the road segment indication is by means of localization.

According to an embodiment, obtaining the road segment indication involves interacting with a vehicle localization process.

According to an embodiment, step 931 may be followed by step 941 of generating a driving related output.

The driving related output may be provided by one or more artificial intelligence model and/or by the output unit and/or by an application that is downstream to the output unit in the sense that the output coming out of the output unit is provided to the application or is further processed before reaching the application.

According to an embodiment, the driving related output may be the outcome of the special-purpose decision making.

According to an embodiment, the driving related output includes at least one of:

- An instruction executable by a man machine interface controller, to provide a recommendation to a driver regarding a navigation of the vehicle.
- A request aimed to the man machine interface controller, to provide a recommendation to a driver regarding a navigation of the vehicle.
- An instruction executable by an autonomous control unit of the vehicle to perform an autonomous driving related operation such as autonomously changing a speed of the vehicle, autonomously changing an acceleration of the vehicle, autonomously changing an acceleration of the vehicle, autonomously changing a mode of operation of the vehicle.
- A request aimed to an autonomous control unit of the vehicle to perform an autonomous driving related operation such as autonomously changing a speed of the vehicle, autonomously changing an acceleration of the vehicle, autonomously changing an acceleration of the vehicle, autonomously changing a mode of operation of the vehicle.
- An instruction executable by a driver assistance control unit (such as but not limited to an ADAS control unit) of the vehicle to perform a driver assisting operation—such as suggesting to the driver a suggested path of progress, a suggested speed and/or acceleration and/or direction of the vehicle, or performing an autonomous braking operation or performing a lane maintenance operation of temporarily, during a short period, takeover the control of the vehicle, and the like.
- A request aimed to a driver assistance control unit (such as but not limited to an ADAS control unit) of the vehicle to perform a driver assisting operation—such as suggesting to the driver a suggested path of progress, a suggested speed and/or acceleration and/or direction of the vehicle, or performing an autonomous braking operation or performing a lane maintenance operation of temporarily, during a short period, takeover the control of the vehicle, and the like.
- An instruction executable by a computer vehicle related to a manner of operation of any component of the vehicle such as brakes, engine, and the like.
- A request sent to a computer vehicle related to a manner of operation of any component of the vehicle such as brakes, engine, and the like.
- Information about the environment of the vehicle.
- A prediction of a future path of the vehicle.
- A prediction of a behavior of one or more road element.
- An emergency alert.
- A collision alert.

According to an embodiment, the method includes outputting and/or transmitting an/or storing and/or instructing to respond to and/or triggering a response to and/or controlling a response to and/or performing a respond to any of the driving related output listed above and/or below.

According to an embodiment, the method includes generating and/or requesting and/or determining and/or instructing and/or triggering and/or controlling and/or transmitting and/or outputting and/or preforming at least one of a warning, an alert signal, a driving alert, an estimated future driving of the vehicle, an estimated future behavior (e.g. movement) of any road element, an autonomous driving operation, an driving assistance output, a prediction output with respect to the behavior (e.g. movement, etc) of the element in the environment—and/or in the environment with re to the vehicle, an operation and/or response in compliant with one or more levels of autonomous driving—such as L2, L2+, L2++, L3 or L4 autonomous driving.

The providing of the driving related output may include storing the driving related output at a location accessible to another unit controller, transmitting instructions of the driving related output to the other unit, sending an indication about the generation of the instructions of the driving related output to the other unit man machine interface controller.

According to an embodiment, the method may include outputting and/or transmitting an/or storing and/or instructing to respond to and/or triggering a response to and/or controlling a response to and/or performing a respond to any of the driving related output listed above and/or below.

Because some aspects of the illustrated embodiments of the present disclosure may, for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any combination of any steps of any method illustrated in the specification and/or drawings may be provided. Any combination of any subject matter of any of claims may be provided. Any combinations of systems, units, components, processors, sensors, illustrated in the specification and/or drawings may be provided. Any combination of any module or unit listed in any of the figures, any part of the specification and/or any claims may be provided.

Any reference in the specification to a method should be applied mutatis mutandis to a device or system capable of executing the method and/or to a non-transitory computer readable medium that stores instructions for executing the method. Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

In the foregoing specification, the invention has been described with reference to specific examples of embodiments of the invention. It will, however, be evident that various modifications and changes may be made therein without departing from the broader spirit and scope of the invention as set forth in the appended claims. The specifications and drawings are, accordingly, to be regarded in an illustrative rather than in a restrictive sense.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Those skilled in the art will recognize that boundaries between the above-described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Thus, the scope of the embodiments of the disclosure is defined by the appended claims and equivalents thereof. While certain features of the disclosure have been illustrated and described herein, many modifications, substitutions, changes, and equivalents will now occur to those of ordinary skill in the art. It is therefore to be understood that the appended claims are intended to cover all such modifications and changes as fall within the true spirit of the invention.

I claim:

1. A method of AI models generalization for driving, the method comprising:

identifying, by a computerized system, road segments artificial intelligence models, based on a similarity metric between different road segments along one or more different driving routes and in accordance with a route benchmark, wherein the road segments artificial intelligence models are generated each in association with a road segment for the driving route, by collecting driving data relating directly to the road segment and reflecting behavioral data of drivers captured along the road segment, to provide a decision making that is adaptive to the road segment; and creating a general artificial intelligence model for at least a portion of the driving route, by automatically merging at least a portion of the road segments artificial intelligence models for the different road segments of the one or more different driving routes based on, at least in part, the similarity metric, to provide a decision making that complies with the different road segments along the one or more different driving routes;

incorporating the general artificial intelligence model within a liquid arrangement of artificial intelligence models;

generating, by the liquid arrangement of artificial intelligence models, and during driving over the at least portion of the driving route, driving related outputs that are instruction executable by an autonomous control unit of the vehicle to perform an autonomous driving related operation during an autonomous driving of the vehicle; and autonomously driving the vehicle under a control of the autonomous control unit.

2. The method according to claim 1, further comprising determining the route benchmark for the driving route.

3. The method according to claim 2, further comprising providing an indication with respect to a requirement for a generation of a mature road segment artificial intelligence model, in accordance with the route benchmark.

4. The method according to claim 1, further comprising generating another road segment artificial intelligence model for another road segment, using the general artificial intelligence model.

5. The method according to claim 4, wherein the other road segment is along another driving route that is different from the one or more different driving routes.

6. The method according to claim 4, wherein the other road segment is along at least one of the one or more different driving routes.

7. The method according to claim 1, wherein the incorporating is based on an artificial intelligence model representation correlation between the general artificial intelligence model and the artificial intelligence models of the liquid arrangement.

8. The method according to claim 1, wherein with the liquid arrangement of the artificial intelligence models being implemented by neural networks, the incorporating involves having a shared plurality of neural neurons with at least a part of the neural networks.

9. A non-transitory computer readable medium storing instructions that, when executable by at least one processing device, cause the processing device to:

identify, by the at least one processing device, road segments artificial intelligence models, based on a similarity metric between different road segments along one or more different driving routes and in accordance with a route benchmark, wherein the road segments artificial intelligence models are generated each in association with a road segment for the driving route, by collecting driving data relating directly to the road segment and reflecting behavioral data of drivers captured along the road segment, to provide a decision making that is adaptive to the road segment; and create a general artificial intelligence model for at least a portion of the driving route, by automatically merging at least a portion of the road segments artificial intelligence models for the different road segments of the one or more different driving routes based on, at least in part, the similarity metric, to provide a decision making that complies with the different road segments along the one or more different driving routes;

incorporate the general artificial intelligence model within a liquid arrangement of artificial intelligence models;

generate, by the liquid arrangement of artificial intelligence models, and during driving over the at least portion of the driving route, driving related outputs that are instruction executable by an autonomous control unit of the vehicle to perform an autonomous driving related operation during an autonomous driving of the vehicle; and autonomously drive the vehicle under a control of the autonomous control unit.

10. The non-transitory computer readable medium according to claim 9, further storing instructions that, when executable by the at least one processing device, cause the processing device to determine the route benchmark for the driving route.

11. The non-transitory computer readable medium according to claim 10, further storing instructions that, when executable by the at least one processing device, cause the processing device to provide an indication with respect to a requirement for a generation of a mature road segment artificial intelligence model, in accordance with the route benchmark.

12. The non-transitory computer readable medium according to claim 9, further storing instructions that, when executable by the at least one processing device, cause the processing device to generate another road segment artificial intelligence model for another road segment, using the general artificial intelligence model.

13. The non-transitory computer readable medium according to claim 12, wherein the other road segment is along another driving route that is different from the one or more different driving routes.

14. The non-transitory computer readable medium according to claim 12, wherein the other road segment is along at least one of the one or more different driving routes.

15. The non-transitory computer readable medium according to claim 9, wherein the general artificial intelligence model is incorporated within the liquid arrangement based on an artificial intelligence model representation correlation between the general artificial intelligence model and the artificial intelligence models of the liquid arrangement.

16. The non-transitory computer readable medium according to claim 9, wherein with the liquid arrangement of the artificial intelligence models being implemented by neural networks, the general artificial intelligence model is incorporated within the liquid arrangement at least by having a shared plurality of neural neurons with at least a part of the neural networks.

17. A system of AI models generalization for driving, the system comprising at least one processing device configured to:

identify road segments artificial intelligence models, based on a similarity metric between different road segments along one or more different driving routes and in accordance with a route benchmark, wherein the road segments artificial intelligence models are generated each in association with a road segment for the driving route, by collecting driving data relating directly to the road segment and reflecting behavioral data of drivers captured along the road segment, to provide a decision making that is adaptive to the road segment; and create a general artificial intelligence model for at least a portion of the driving route, by automatically merging at least a portion of the road segments artificial intelligence models for the different road segments of the one or more different driving routes based on, at least in part, the similarity metric, to provide a decision making that complies with the different road segments along the one or more different driving routes;

incorporate the general artificial intelligence model within a liquid arrangement of artificial intelligence models;

generate, by the liquid arrangement of artificial intelligence models, and during driving over the at least portion of the driving route, driving related outputs that are instruction executable by an autonomous control unit of the vehicle to perform an autonomous driving related operation during an autonomous driving of the vehicle; and autonomously drive the vehicle under a control of the autonomous control unit.

* * * * *